United States Patent [19]

Mendenhall

[11] 4,104,736
[45] Aug. 1, 1978

[54] APPARATUS AND METHOD FOR RECYCLING USED ASPHALT-AGGREGATE COMPOSITION

[76] Inventor: Robert L. Mendenhall, 1770 Industrial Rd., Las Vegas, Nev. 89102

[21] Appl. No.: 754,312

[22] Filed: Dec. 27, 1976

[51] Int. Cl.$^2$ .............................................. E01C 19/10
[52] U.S. Cl. ......................................... 366/2; 366/25; 366/33
[58] Field of Search ............... 259/147, 146, 148, 155, 259/156, 157, 158, 159 R, 159 A, 3, 2, 14; 106/273 R, 276, 277, 285; 404/79; 423/210, 210.5; 23/277 C

[56] References Cited

U.S. PATENT DOCUMENTS

| 2,805,052 | 9/1957 | Preeman | 259/159 A |
| 2,945,683 | 7/1960 | Martinson | 259/159 A |
| 3,106,384 | 10/1963 | Preeman | 259/159 R |
| 3,832,201 | 8/1974 | Shearer | 259/158 |
| 3,866,888 | 2/1975 | Dydzyk | 259/158 |

Primary Examiner—Robert W. Jenkins
Attorney, Agent, or Firm—Seiler & Quirk

[57] ABSTRACT

An improved asphalt-aggregate recycling process includes heating asphalt-aggregate composition by direct exposure to hot gases of combustion to form a gaseous exhaust mixture of carbon dioxide, water vapor and hydrocarbon volatiles from the heated asphalt, subjecting the gaseous mixture to a centrifugal force sufficient to separate the mixture into a first layer comprising a major amount of the hydrocarbon volatile condensate particles, and a second layer comprising a major amount of the carbon dioxide and water vapor. The first layer containing the condensed hydrocarbon volatiles is then separated out and preferably directed to a hydrocarbon burner as fuel for heating the asphalt-aggregate composition. The improved apparatus improves means for centrifugally physically separating the hydrocarbon from the gaseous mixture.

7 Claims, 3 Drawing Figures

APPARATUS AND METHOD FOR RECYCLING USED ASPHALT-AGGREGATE COMPOSITION

BACKGROUND OF THE INVENTION

In my co-pending applications Ser. No. 603,357, filed Aug. 11, 1975, and Ser. No. 729,705, filed Oct. 5, 1976, there are disclosed methods and apparatus for recycling used asphalt-aggregate compositions. More specifically, in those applications there are disclosed methods and apparatus for directly exposing used asphalt-aggregate compositions to flame and/or hot gases of combustion. The apparatus disclosed, and which is of the type used in this invention, comprises an elongated rotating drum including lifters for alternately elevating the particles and then allowing them to drop in a cascading manner through the hot gases. Although the purpose of the inventions disclosed in those applications is to prevent overheating the asphalt-aggregate particles by separating the material to be recycled into different particle size ranges, and introducing the various particle sizes into areas of a heating apparatus where the hot gases of combustion to which the particles are exposed will be low enough to prevent overheating and degradation of the particles, it has been found that some volatilization of hydrocarbons results from exposure of particles to the hot gases in the processing. For example, where coarse composition particles are introduced into an input drum end where temperatures are at their hottest because of flame and hot gases of combustion being introduced into the drum at that end, for example, 1,000°–2,000° F or more, some volatilization of hydrocarbons from the coarse asphalt containing particles will occur as they pass through these hot gases. In addition, it is also found that some smaller or fine asphalt containing particles will be present with the coarse composition introduced into the hottest input drum end, which fine particles have not become separated in the particle size separation processing, or have resulted from handling of the coarse particles as they are transferred from a stockpile for introduction into the heating apparatus. Since these small particles will become readily heated when exposed to the hot gases of combustion, volatilization of hydrocarbons therefrom during the direct exposure recycle processing may be unavoidable. Accordingly, the resulting gaseous mixture created in such a recycle processing includes not only the relatively clean exhaust gases from the burner which has supplied the hot gases of combustion to the asphalt-aggregate heating apparatus, which gases include nitrogen, carbon dioxide and water vapor, but also significant amounts of the asphalt hydrocarbon volatiles which should not be exhausted into the atomosphere where atmospheric pollution controls are required.

SUMMARY OF THE INVENTION

According to the present invention, a gaseous mixture produced by direct exposure of asphalt-aggregate composition particles to flame and/or hot gases of combustion during recycling is exhausted to a means for physically separating the hydrocarbon volatile materials from the carbon dioxide and water vapor. This is accomplished by cooling the gaseous exhaust to form small particles of hydrocarbon condensate and utilizing a centrifugal means through which the gaseous mixture is passed to create a laminar gas flow and whereby the heavier asphalt hydrocarbon volatile condensate will be forced into a first layer which then is separated and vented for further treatment. The lighter gaseous mixture layer comprising major amounts of carbon dioxide and water vapor together with atmospheric nitrogen, which are "clean" and not generally considered unsuitable atmospheric pollutants, are vented into the atmosphere. Preferably, the hydrocarbon condensate containing layer is directed to a hydrocarbon burner as fuel for further heating the asphalt-aggregate composition in the recycled processes. The heating and mixing apparatus in which the asphalt-aggregate compositions are exposed to flame and/or hot gases of combustion are disclosed in my aforesaid copending applications which descriptions are incorporated herein by reference.

DETAILED DESCRIPTION OF THE INVENTION

Figure 3:
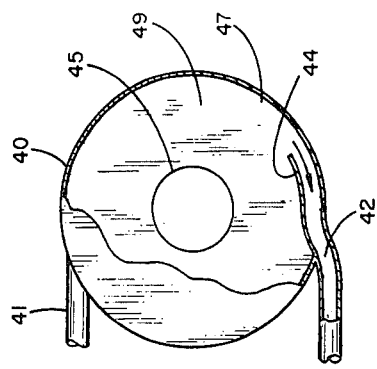
FIG. 3 illustrates a horizontal-type centrifugal separator.

The apparatus shown in the drawings include an elongated rotatable drum 14 having means for introducing asphalt-aggregate particles therein. By the term asphalt-aggregate composition as used herein is meant a composition in which both asphalt and aggregate are present as particles containing both materials and are introduced into the heating and mixing drum 14. Specifically, these compositions will comprise used materials to be recycled, which is broken up from asphaltic concrete roads or other surfaces, crushed, and then introduced into the apparatus. Preferably, these materials will be screened and separated into different particle size portions ranging from coarse to fine, and may include two, three or more particle size portions as disclosed in my aforesaid applications.

The apparatus includes means for introducing these particles, and includes chutes or hoppers which communicate with the drum interior. Where composition is separated into two particle size compositions, coarse particles 17 are introduced at or adjacent the end of the apparatus via a chute 13, whereas smaller composition particles 21 are introduced via chute 25. Input end plate 11 is stationary and chute 13 is secured thereto with means for directing the composition particles into the drum interior. Burner 15, usually a natural gas or hydrocarbon burner, introduces flame and hot gases of combustion directly into the hollow drum interior. The drum interior is preferably provided with lifters for alternately lifting and dropping the composition particles as the drum rotates. The particles become heated as they fall from the lifters and pass through the hot gases of combustion. A state of the art type of chute or hopper arrangement may be used for introducing the particles into the apparatus. Alternatively, the apparatus may include a trough 24 and chute 25, which trough overlies a plurality of ports extending around the drum, not shown, and a plurality of scoops overlying the ports and secured to the drum exterior which pass through the trough thereby picking up composition and introducing it into the ports. Such an alternative means for introducing composition particles into the drum may be used at any position including the input end drum and is disclosed in more details in my aforesaid co-pending applications as well as application Ser. No. 601,177, filed Aug. 1, 1975, which description is incorporated herein by reference. At the output drum end is a stationary end wall 10 through which product composition 26, which has thoroughly been heated and mixed, is recovered.

From the heating apparatus, the burner exhaust gases from burner 15 which pass through the cascading mass of asphalt-aggregate composition particles, include carbon dioxide and water vapor from the oxidation of the hydrocarbon burner fuel as well as substantial amounts of hydrocarbon volatile materials from the heated asphalt containing particles. Of course other gases will also be present such as atmospheric quantities of nitrogen and some carbon monoxide. Although the carbon dioxide and water vapor could otherwise be exhausted directly into the atmosphere without presenting substantial atmospheric pollution problems, the presence of the significant amounts of hydrocarbon materials volatilized from the asphalt usually cannot be tolerated, especially in areas of strict atmospheric pollution control. Thus, these exhaust gases, treated according to the invention, are drawn from the rotating drum 14 at the output drum end via any convenient means such as an exhaust assembly which includes an exhaust stack or conduit 27 and a blower or fan 23.

The exhaust gas drawn from the above-described mixing and heating apparatus via conduit 21 is directed to an apparatus where it is physically separated so as to remove a substantial amount of the hydrocarbons from the gaseous mixture. These hydrocarbons, as previously noted, are generally unacceptable for being vented directly to the atmosphere, especially in areas where air pollution controls are quite strict. The hydrocarbon gases which have been volatilized from the asphalt particles during the heating normally appear as a dark or blue smoke, as they begin to condense under cooler conditions. Thus, the gases are cooled between the heating apparatus and a centrifugal separator whereby hydrocarbon condensate is formed in the gaseous stream. According to the invention this exhaust gas is subjected to a centrifugal force, and because the hydrocarbon condensate is heavier than the carbon dioxide and water vapor containing gaseous mixture, they can be separated in separate laminar streams when so subjected to the centrifugal action. Any suitable type of centrifugal force generating means may be used, so long as the gaseous mixture can be readily introduced therein from the exhaust conduit 21, and the hydrocarbon condensate then formed into a layer, which layer can then be extracted or further separated from the remaining portions of the gaseous mixture. It will be understood that although a layer of hydrocarbon condensate will be described hereinafter as being formed separate from a layer of the remaining lighter gaseous materials, there will be an area between the layers where significant amounts of both materials will be present. Accordingly, any such physical separation will not be absolutely precise, but each separately defined layer will contain a major amount of those materials so stated, even though some hydrocarbon condensate will also be present in the lighter gaseous layer. It will be understood that the asphalt hydrocarbon volatiles will be gaseous in the exhaust mixture until such time as the temperature drop and hydrocarbon concentration results in condensation. The hydrocarbon condensate will normally form in the cooler heating drum end or between the drum and the centrifuge. The hydrocarbon condensate particles are quite small so that there is no problem of formation of larger hydrocarbon particles in the centrifuge.

Figure 2:
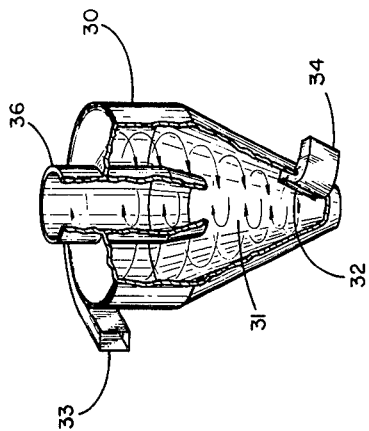
FIG. 2 illustrates a vertical-type apparatus through which the gaseous mixture is passed for centrifugal separation.
Figure 1:
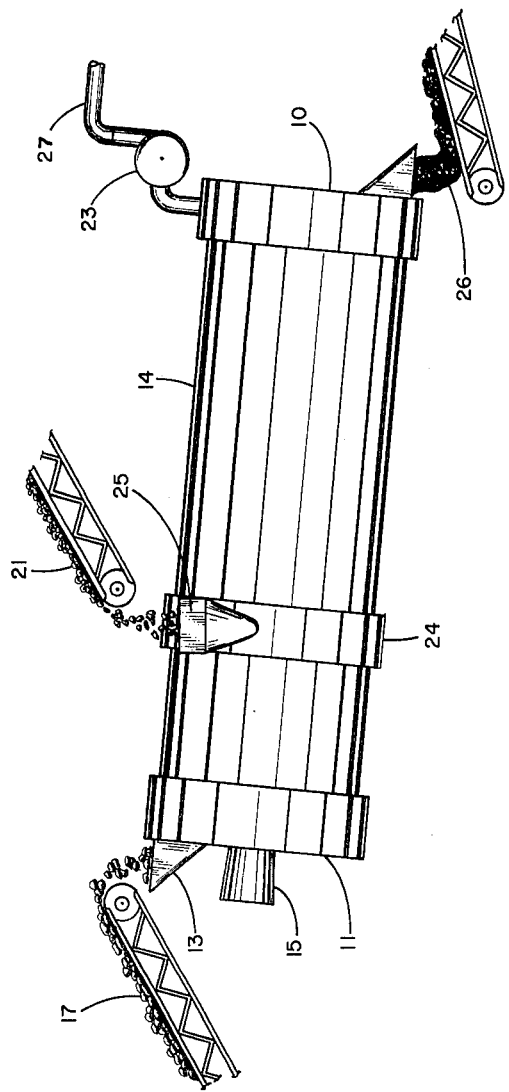
FIG. 1 illustrates a preferred apparatus of the invention for treating used asphalt-aggregate composition and from which exhaust gases are obtained.

FIG. 2 illustrates a vertical type of apparatus into which the gaseous mixture may be directed. The design of the vertical centrifuge 30 includes a hollow interior chamber 31 having preferably a conical shape in the bottom or lower portion. Also forming a portion of the apparatus is outlet member 36 through which the non-hydrocarbon condensate containing gaseous layer is exhausted. A conduit 33 which is connected to conduit 21 of the mixing and heating apparatus is for directing the gases into the centrifuge in such a manner which will be directed in a circular flow pattern generally in the direction of the arrows within the chamber 31. Because of the internal shape of the device and the chamber, the gases are forced initially downwardly along the sloping chamber sides so that a higher and higher velocity is achieved in a vortex pattern until it reaches the lower part of the chamber, where it then is reversed and is pulled upwardly into the exhaust member 36. A divider plate 32 extends around the portion of the lower area of the cone shaped interior, the leading edge of which plate is positioned so as to cut through or intercept that swirling flow of gases between the hydrocarbon condensate layer, which will be gravitationally forced to the outside of the gaseous mass flow, i.e., nearest the interior chamber sides and the lighter gases. Accordingly, plate 32 will cause the hydrocarbon condensate containing layer to be directed into exhaust conduit 34 for further treatment. On the other hand, the lighter non-hydrocarbon layer of gases, which remain nearer the center of the spiraling gaseous mass is then reversed and is drawn upwardly into exhaust member 36 and may be then exhausted in the atmosphere. If desired, a gate or other means may be present in the bottom of the centrifugal chamber for removing inorganic or mineral particulate matter or dust which results from the aggregate. Most of these particles will also be centrifugally forced into the hydrocarbon condensate layer and thus separated therewith.

FIG. 3 illustrates another example of a centrifugal apparatus which may be used to treat the gaseous mixture. This apparatus includes a drum having hollow chamber into which gaseous mixture is directed via conduit 41. An exhaust port 45 is centrally located for venting the lighter gas from the centrifugal chamber. In operation, the previously described gaseous mixture is forced into conduit 41 where it will be directed in a circular manner around the interior drum chamber by which centrifugal forces will force a laminar flow of the heavier asphalt hydrocarbon containing moiety nearest the interior side of the apparatus. The layer of lighter gases will flow closer to the center in the centrifugal chamber and be pulled or exhausted therefrom through exhaust port 45 and vented into the atmosphere or further treated as desired. The hydrocarbon condensate containing layer 47, is then separated by a separator plate 44 which extends into the chamber at a proper spacing from the interior chamber walls. Preferably, this plate 44 can be adjusted so as to allow for separation of any desired amount of hydrocarbon layer, yet again it being understood that these layers will not be precisely defined at the interface. This hydrocarbon containing layer is then directed into passageway 42 for further treatment.

Treatment of the hydrocarbon condensate containing gaseous layer which has been separated from the gaseous exhaust mass is accomplished by directing this stream to a burner. Preferably, according to the invention, the hydrocarbons which are combustible, are directed back to the burner 15 as fuel and ignited so as to produce flame and gases of combustion for heating the recycling asphalt-aggregate composition as previously described within heating and mixing drum 14. Thus, according to the invention, not only in atmospheric pollution significantly reduced, but the valuable hydrocarbon volatiles are recovered and utilized for producing energy to be used within the recycling process itself. The types of apparatus for centrifugally separating and treating the exhaust gaseous mixture from the asphalt-aggregate recycling apparatus disclosed are given by way of example only, and the process of the invention is not to be so limited. Accordingly, equivalent means may be used as may other embodiments within the purview of the invention.

I claim:

1. A process for heating asphalt-aggregate composition comprising directly exposing the composition to hot gases of hydrocarbon combustion to form a gaseous exhaust mixture comprising carbon dioxide, water vapor and hydrocarbon volatiles form heated asphalt, directing said gaseous mixture through a chamber to create centrifugal force on said gaseous mixture sufficient to separate said mixture into a first layer comprising said hydrocarbon volatiles, and a second layer comprising said carbon dioxide and water vapor, directing said first layer to a combustion chamber in which a flame and oxygen containing gas is introduced, and directing said second layer to atmosphere.

2. The process of claim 1 wherein said combustion chamber comprises means for heating said asphalt-aggregate composition.

3. The process of claim 2 including cooling said gaseous exhaust mixture while directing it to said chamber to condense at least a portion of said hydrocarbon volatiles.

4. Apparatus for treating asphalt-aggregate composition comprising:
 a hydrocarbon burner for supplying hot gases of combustion into a heating chamber,
 means for introducing asphalt-aggregate composition in said heating chamber whereby said composition is exposed directly to said hot gases of combustion,
 means for exhausting a gaseous mixture from said heating chamber comprising carbon dioxide, water vapor, and hydrocarbon volatiles from the heated asphalt,
 means for physically separating said mixture into a first layer comprising said hydrocarbon volatiles and a second layer comprising said carbon dioxide and water vapor, and
 means for directing said first layer to said hydrocarbon burner and directing said second layer to atmosphere.

5. The apparatus of claim 4 wherein said means for physically separating said mixture comprises a centrifugal separator.

6. The apparatus of claim 5 including an inlet port in said centrifugal chamber for said gaseous mixture and an outlet port for said first and second layers.

7. The apparatus of claim 6 including a plate means for separating said first and second layers adjacent said outlet port.

* * * * *